March 18, 1941.  E. A. WEIDENMILLER  2,235,492
COOKY MOLDING MACHINE
Filed Nov. 14, 1940 4 Sheets-Sheet 1

Inventor
Edward A Weidenmiller
BY
Fred Bing
Attorneys.

March 18, 1941.  E. A. WEIDENMILLER  2,235,492
COOKY MOLDING MACHINE
Filed Nov. 14, 1940    4 Sheets-Sheet 2

Inventor
Edward A. Weidenmiller
BY
Ferd Bing
Attorneys.

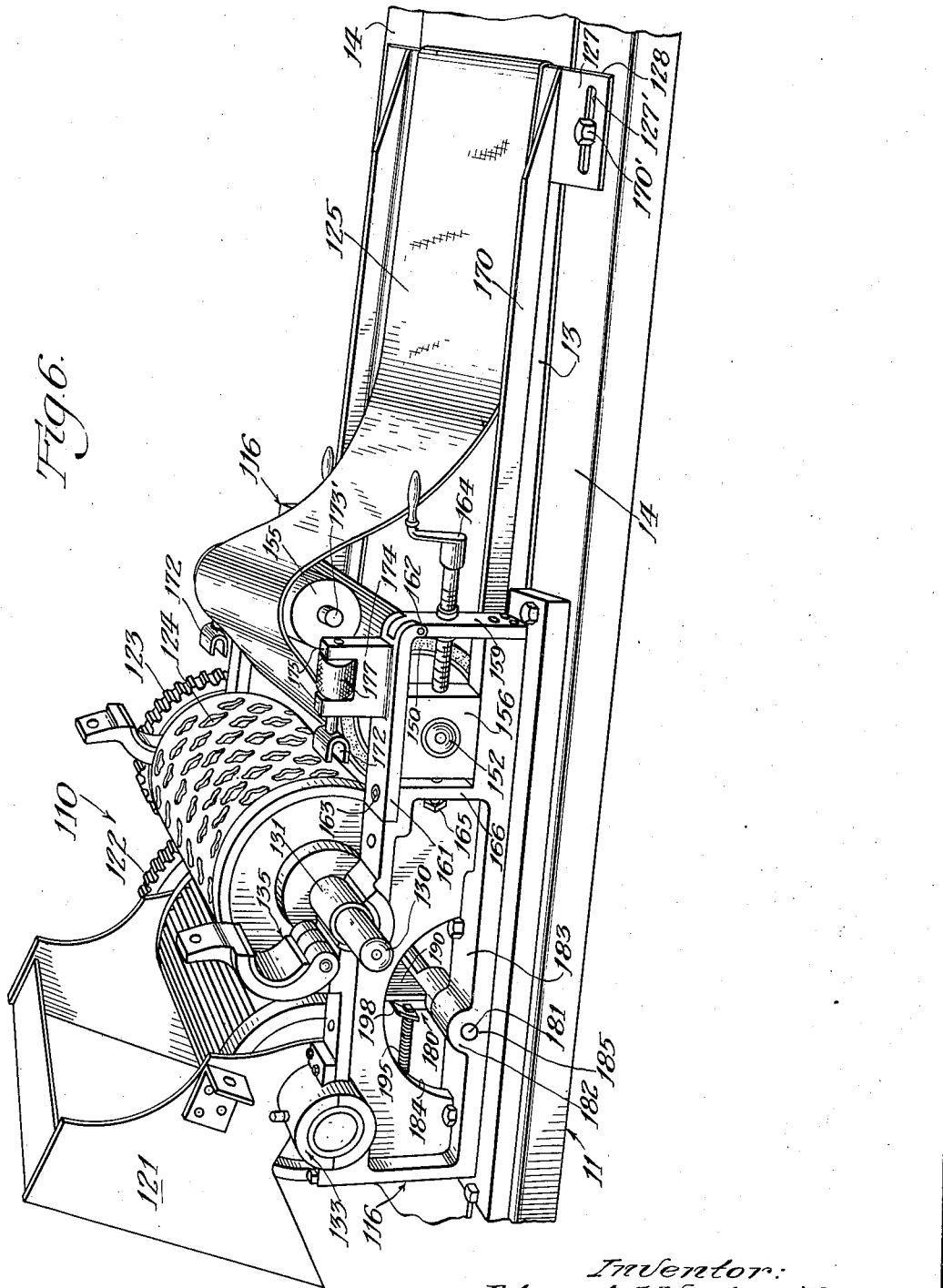

March 18, 1941.   E. A. WEIDENMILLER   2,235,492
COOKY MOLDING MACHINE
Filed Nov. 14, 1940   4 Sheets-Sheet 4
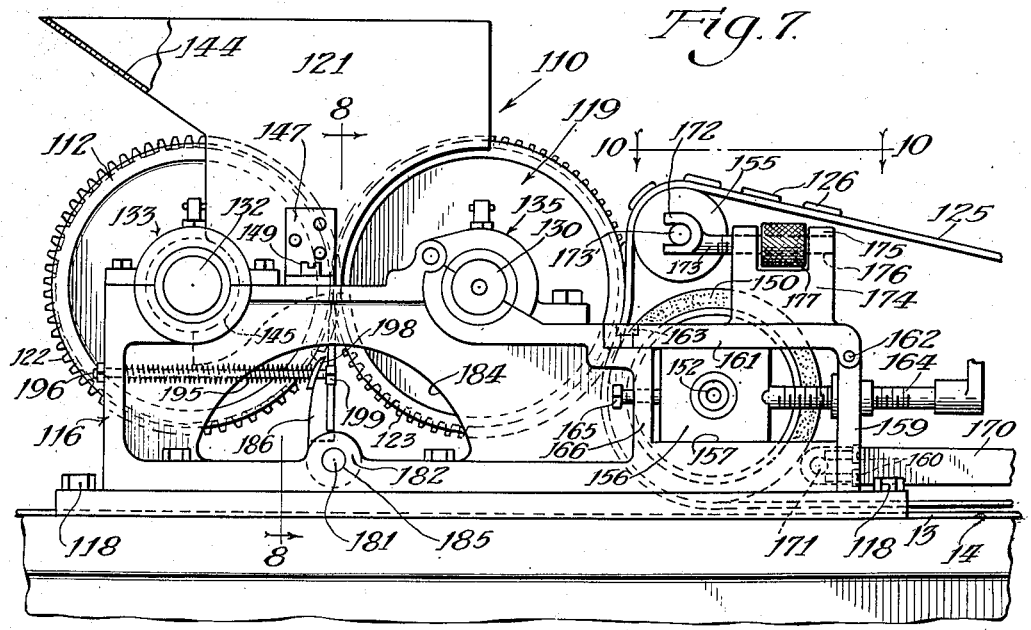
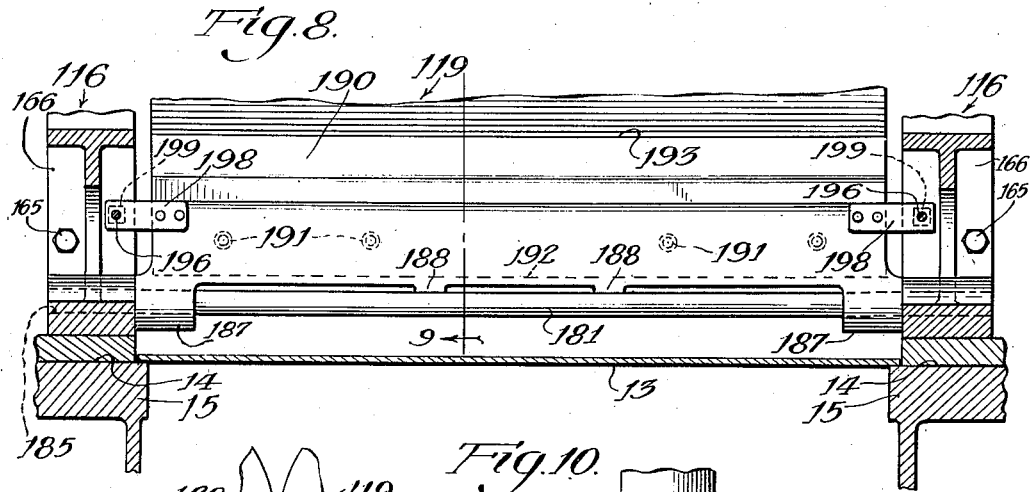
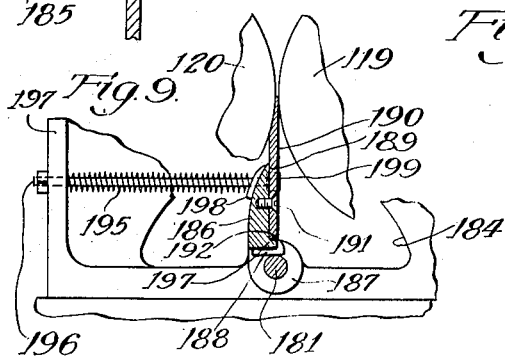
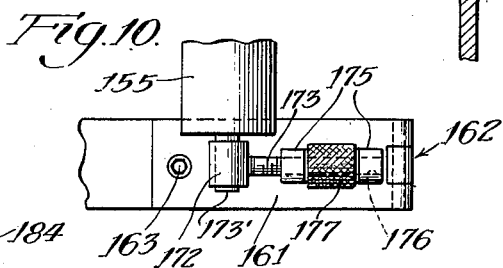
Inventor:
Edward A. Weidenmiller
By: Ferd Bing
Attorney Patented Mar. 18, 1941

2,235,492

UNITED STATES PATENT OFFICE 2,235,492

COOKY MOLDING MACHINE

Edward A. Weidenmiller, Chicago, Ill.

Application November 14, 1940, Serial No. 365,670

15 Claims. (Cl. 107—8)

This application is a continuation in part of my co-pending application, Serial No. 329,623, filed April 15, 1940.

The invention relates to cooky molding machines, and more particularly to such machines of the rotary type wherein cookies are formed in the die cavities of a continuously rotating cylindrical die roll.

Cooky machines of this character are customarily used in large baking plants where cookies of a particular design or form are molded by the machine at a rapid production rate and are deposited by the machine onto conveyor-carried pans, or directly onto a steel band conveyor so as to be advanced through a continuous type baking oven.

Such machines, in a general sense, embody a hopper for receiving the dough which passes therefrom into the space between opposed forcing and die rolls which form the bottom of the hopper. The die roll and the forcing roll are driven in unison in opposite directions so that the cooky die cavities in the die roll are filled with dough which is compressed in the die cavities so as to properly form the cooky blanks. In the continued rotation of the die roll, the excess dough is trimmed from the exposed face of the cooky blanks, and the cooky blanks are then extracted from the die cavities. This extraction is usually attained by means including a fabric belt which delivers the cooky blanks to the oven conveyor or the pans.

Since such machines have a very high production rate, often exceeding one million cookies in an eight hour day, it is necessary to change the die roll several times during a working day so as to limit the production of each cooky design to a reasonable amount. In view of these frequent changes, an important object of the present invention is to provide a new and improved cooky molding machine wherein the changing of the die roll is simplified and requires less time than in prior machines, thereby to reduce the idle time of the machine and of the oven with which it is normally associated or used.

A further object is to provide such a machine wherein the danger of damaging the die rolls during the roll changing operation is minimized.

In the extraction means of such cooky machines the fabric belt is pressed against the exposed faces of the cookie blanks by means of a rubber covered pressure roll. This rubber roll is formed by means of a rubber sleeve or sheath surrounding and fixed upon a steel core or shaft which provides the rotatable bearings for the rubber roll. Since the cooky dough contains a relatively high percentage of shortening which is expressed from the dough at various stages of the molding operation, and since the belt is normally well soaked in such shortening to attain better extraction, it is found that such shortening accumulates on the rubber roll; and while the rubber itself may be selected to resist the deteriorating action of the shortening, it is found that such shortening gathers also on the ends of the rubber roll, so as to work into the annular joint formed between the rubber sleeve and its steel core. This entry of the grease or shortening loosens the end portions of the rubber sleeve from the supporting core, and this result is detrimental since it reduces the extracting efficiency of the machine.

Another object of the present invention is, therefore, to reduce the failures of the extracting means by providing a cooky molding machine wherein the ends of the rubber roll are so positioned that the operators may easily remove the grease or shortening from the ends of the roll and thereby prevent loosening of the rubber sleeve or coating thereof.

Cooky molding machines of this character are used in bakeries where the conveyor type oven often has a relatively large biscuit and cracker cutting machine permanently associated with the intake end of the oven, and another object of the present invention is to provide a cooky molding machine adapted for association with such a permanently mounted cutting machine so as to deliver the molded cookies to the oven conveyor.

A further object is to provide such a cooky molding machine wherein all of the operating parts are located above the level at which the cookies are finally delivered by the extraction belt, thereby to particularly adapt the molding machine of the present invention for mounting on and operative association with the standard cutting machine base.

A further object is to provide such a cooky molding machine wherein all of the operating parts are located above said delivery level and which avoids undue height of the machine.

A further object is to provide a machine of this character wherein the delivery belt or extraction belt may be released or slackened in a comparatively simple manner.

A further object is to provide such a cooky molding machine wherein the tightening means for the extraction belt acts upon said belt at a point relatively close to the cooky molding roll.

Another object is to provide such a cooky molding machine wherein the replacement of the extraction belt may be attained in a relatively simple manner.

Another object is to provide such a cooky molding machine wherein the extraction belt at the point of delivery of the cookies to the conveyor is relatively rigid in the sense that it is at all times positioned with its leading edge or delivery edge at right angles to the path of travel of the conveyor.

A further object of the invention is to provide such a cookie molding machine having an improved mounting for the hopper whereby replacement or changing of the cooky die roll is simplified and facilitated.

A further object is to provide a cooky machine of this character embodying new and improved means for scraping excess dough from the die roll so as to properly form the outer or bottom surfaces of the cooky blanks prior to their extraction from the die cavities.

Other objects and advantages will become apparent from the following description, taken in connection with the accompanying drawings, in which:

Fig. 6 is a view similar to Fig. 1 illustrating an alternative embodiment of the invention;

Fig. 7 is a fragmental side elevational view of the machine shown in Fig. 6;

Fig. 8 is a fragmental sectional view taken along the line 8—8 of Fig. 7;

Fig. 9 is a fragmental cross-sectional view taken along the line 9—9 of Fig. 8; and Fig. 10 is a fragmental plan view as viewed from the line 10—10 of Fig. 7.

Figure 1:
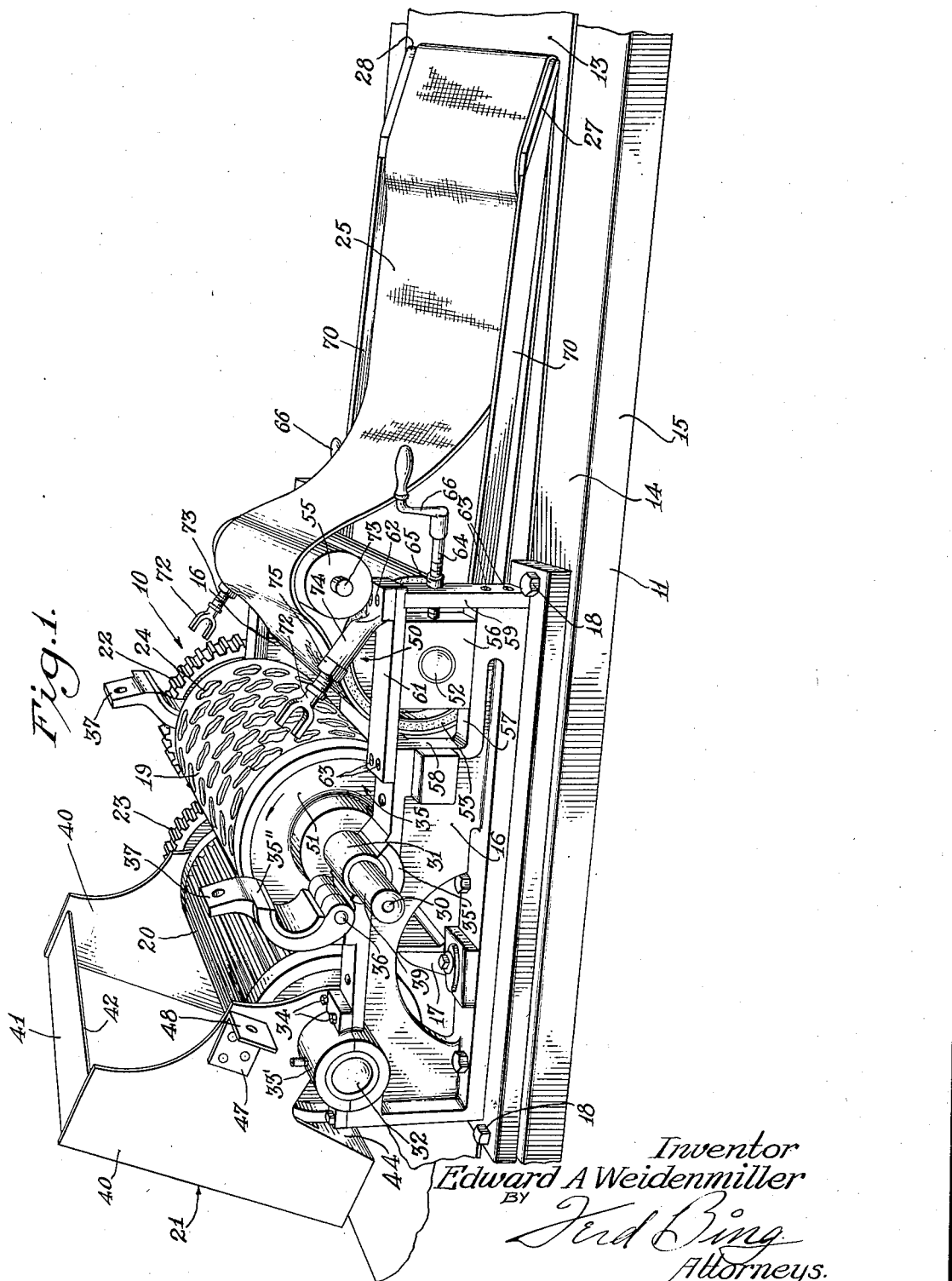
Fig. 1 is a perspective view showing a cooky molding machine embodying the features of the invention, the operating parts thereof being disposed in a released or separated relation in which they are positioned when it is desired to change the cooky molding roll.

While I have illustrated in the drawings and will herein describe in detail but two embodiments of the invention, it is to be understood that this description is made only for the purpose of illustration and is not to be taken as a limitation to the specific construction and arrangement shown. The scope of the invention will be defined by the appended claims.

In the form chosen for disclosure in Figs. 1 to 5 of the drawings, the invention is embodied in a cooky molding machine 10 of the attachment type, adapted to be mounted on any suitable base, such as the base 11 of a conventional cracker cutting machine. Such a cracker cutting machine is normally mounted in a permanent relationship to an oven 12 of the continuous type so that a conveyor belt 13 extends through to the base 11 of the cutting machine and through the oven 12. Thus the various articles to be baked are formed and disposed on the conveyor 13 and are moved through the oven so as to be baked and are then discharged at the other end of the oven by the conveyor.

The cooky molding machine 10 of the present invention is adapted to be mounted on the upper surface 14 of the side rails 15 of the frame 11, the side rails 15 being disposed on opposite sides of the upper run of the conveyor 13. The cooky molding machine 10 is so constructed that all of its operating parts are disposed above the level of the surface 14. To this end the machine 10 has a pair of side frames 16 suitably connected together by means which includes a transverse member 17, and these side frame members 16 are clamped on to the surface 14 of the side rails 15 by means of headed studs 18.

The side frame members 16 serve to support the various operating members of the present invention there being a cylindrical die roll 19 and a forcing roll 20 of conventional form disposed on parallel transverse axes with a hopper 21 overlying the exposed upper faces of the rolls 19 and 20 so that when the two rolls are operated in unison in opposite directions by means such as drive gears 22 and 23 the dough in the hopper 21 is forced into the cooky molding die cavities 24 of the die roll 19.

In molding the cookies the adjacent or exposed surfaces of the rolls 19 and 20 move downwardly as indicated by the arrows in the drawings and the excess dough on the exposed faces of the molded cooky blanks is removed by means of a conventional spring steel knife mounted on or forming a part of the transverse member 17. As these cooky blanks move with the roll 19 toward the right and upwardly in Fig. 3, the blanks are contacted by the surface of an endless extracting belt 25 to which the cookies 26 adhere so as to be withdrawn from the die cavities in which they have been molded or formed. The delivery belt 25 extends to the right in Figs. 1 to 3 and downwardly about a nose plate 27 which has a fairly sharp forward edge 28 and the cookies therefore fall in a known manner from the belt 25 on to the conveyor 13 by which they are then moved through the oven. In the event that a pan conveyor is used such as the conveyor 13' of Fig. 4, the cookies are, of course, discharged on the pans which are moved beneath the nose plate 27 in timed relation to the movement of the extracting belt 25.

The gears 22 and 23 of rolls 19 and 20 are intermeshed so as to produce the desired rotation of these two rolls, and the gears may be driven by any conventional means. In the event that the cooky molding attachment 10 is mounted on a conventional cracker cutting or like machine, the two rolls 19 and 20 may be driven in a known manner by suitable speed reducing and drive chain means from the usual power means 29 mounted in the base 11.

In accordance with the present invention the cooky molding roll 19 has a central shaft 30 upon which the drive gear 22 is fixed at one end, and the projecting ends of this shaft 30 provide trunnions 31 which are adapted to rest in suitable bearings in the side frames 16. The forcing roll 20 has a similar central shaft 32 having its projecting ends arranged to form supporting trunnions. These supporting or trunnion-like ends of the shaft 32 of the forcing roll 20 are supported in similar bearings 33 formed along the upper edge of the side frames adjacent the left-hand end thereof as herein shown. The lower half 33 of each bearing is formed in the upper face of its side frame 16 while the upper half 33' of each bearing 33 is separately formed and is removably secured in place by a plurality of headed studs 34. The height of the bearing 33 above the mounting face 14 is so proportioned that the lower face of the roll 20 is relatively close to the surface 14, or more exactly stated, is relatively close to the upper run of the conveyor 13.

Figure 3:
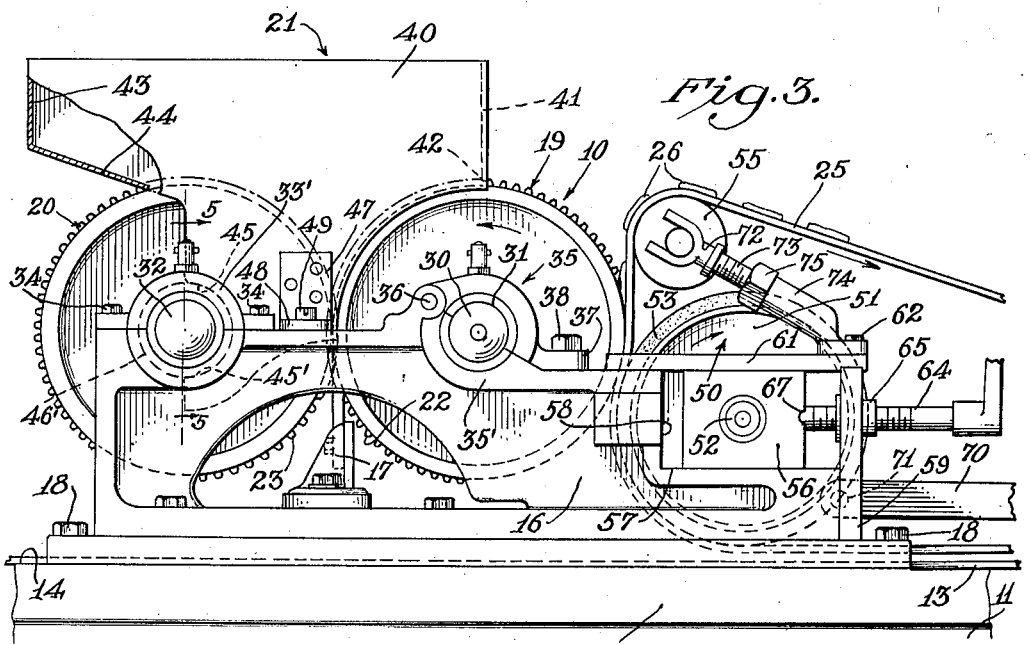
Fig. 3 is an enlarged fragmental portion of the machine shown in Fig. 2.
Figure 4:
Fig. 4 is a fragmental view illustrating a conventional pan conveyor with which the present machine may be readily used.

The molding roll 24 is supported on an axis which is at the same height as the axis of the forcing roll 20, and such support is, in accordance with the present invention, provided by readily separable bearings 35 which are so disposed as to facilitate the removal and replacement of the die roll 19. Thus it will be seen that each bearing 35 comprises a lower fixed portion 35' and an upper separable portion 35", the lower portion being formed as a part of the side frame 16 and the upper portion being separately formed. In accordance with the present invention a portion of the bearing 35" is pivotally related to the side frame so that when the bearing is released, the upper portion may be pivoted to an out-of-the-way position. As best shown in Figs. 1 and 3, the upper and lower portions of the bearing 35 are separable in a plane which is disposed at substantially 30° to the horizontal so that in removing the die roll from the bearings, the die roll may be moved upwardly and slightly to the right as herein shown. The upper section 35" of the bearing 35 is therefore pivoted on an axis lying in said plane parallel to the axis of the bearing and on the left-hand side of the bearing axis. On the right-hand side of the bearing axis the upper bearing section 35" has a clamping flange 37 adapted to be secured to the frame by headed studs 38 so as to clamp the bearing tightly about the trunnion 31 of the die roll. After the studs 38 have been removed, the upper section of the bearing may be pivoted about its axis from the closed or operative position of Fig. 3 to the upper or released position of Fig. 1. It will be noted that the shaft 30 of the molding roll has a portion 39 extending beyond the trunnioned portion to facilitate lifting of the die roll, and such a portion 39 is provided on both ends of the shaft 30.

The hopper 21 comprises two segmentally formed end plates 40 which in the normal position of the hopper as shown in Fig. 3 bear against the end edges of the upper portions of the rolls 19 and 20. At its right-hand or forward face the hopper has a forward wall 41 connecting the two side plates 40, and this forward wall 41 in the normal position of the hopper has its lower edge 42 positioned relatively close to the upper face of the die roll 19 and substantially in the vertical plane passing through the axis of the die roll. At its other edge or rear edge the hopper has a vertical wall 43 connecting the two side plates 40 and in addition has a bottom plate 44 connecting the side plates and extending from the rear wall 43 to a point relatively close to the upper surface of the forcing roll 20.

Figure 5:
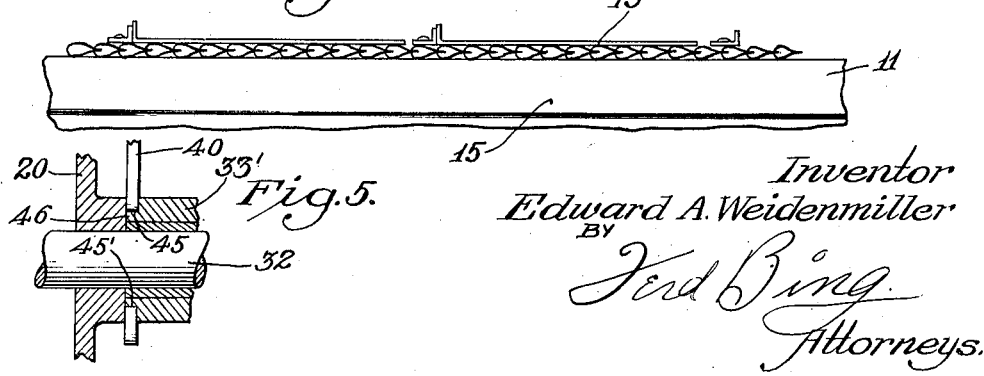
Fig. 5 is a fragmental sectional view taken along the line 5—5 of Fig. 3 and illustrating a part of the hopper mounting.

When the die roll 19 is to be removed the hopper 21 must be moved to an out-of-the-way position, since in its operative position it is located in close association with and partially overlying the die roll 19. In accordance with the present invention the hopper 21 is so mounted and related to the frame of the machine 10 that such shifting of the hopper 21 to an out-of-the-way position is facilitated. To this end the hopper end plates 40 are formed with arcuate bearing portions 45 which rest against an arcuate bearing surface 46 which projects inwardly from the upper and lower portions of each bearing 33. This relationship is shown in Figs. 3 and 5. It will be noted that when the hopper is in its upright or normal position of Fig. 3, a lower portion 45' of the arcuate bearing surface engages the lower part of the bearing surface 46, so that by engagement of these two surfaces the hopper is held against upward movement and also against movement to the left in Fig. 3. This interlocked bearing relationship is utilized in simplifying the securing means whereby the hopper is held in its operative upright position, and in addition the relation of the bearing surfaces also simplifies the shifting of the hopper to its inoperative or out-of-the-way position. The hopper is further secured in place by means of angle brackets 47 secured to the end plates 40 so that when the hopper is in the desired upright position, one leg 48 of each bracket bears upon the upper surface of the side frame 16 between the two bearings 33 and 35. When it is desired to secure the hopper in position a headed stud 49 is extended through the arm 48 of each angle bracket and is threaded into the side frame 16.

When the hopper is to be moved to an out-of-the-way position, the studs 49 are removed and the hopper is rocked to the left to the position of Fig. 1 about the bearing surfaces 45 and 46. Thus the hopper is released and moved to an out-of-the-way position in a simple manner, and it will be evident that its return to its operative position is relatively simple since the bearing surfaces 45 and 46 act to guide it in its movement.

The extracting belt 25 is pressed against the die roll 19 by resilient means such as a rubber covered roll 50 which is in many instances termed the extracting roll. This roll 50 is preferably relatively large in diameter and comprises a metallic core 51 having an axial shaft with projecting end bearings 52, and the core 51 has a rubber coating 53 thereon. The rubber roll 50 is supported so that it opposes the die roll 19 slightly below a horizontal plane passing through the axis of the die roll. The extracting belt is, of course, extended from the nose plate 27 to the left beneath the rubber roll 50 and between the rubber roll and the die roll so as to extend over an elevated tightening or idler roll 55 which is supported above the rubber roll and in spaced relation to the die roll. From the idler roll 55 the upper run of the belt 25 extends to the right over the nose plate 27.

The rubber roll 50 is supported, in accordance with the present invention, as low as possible while yet maintaining the lower face of the roll in spaced relation to the surface 14 and the conveyor 13. The rubber roll 50 is also supported for movement toward and away from the die roll 19 so that the pressure of the rubber roll against the die roll may be adjusted to produce the optimum extracting action. Such a mounting is attained in the present case by providing bearing blocks 56 in which the end trunnions 52 of the rubber roll are journaled. These bearing blocks 56 are supported on horizontal surfaces 57 formed in the side frame 16 adjacent the right end thereof. Movement of the bearing block 56 to the left is limited by an end surface 58, while movement to the right is limited by vertical end members 59 which are secured by means of screws 60 to the right-hand ends of the side frames 16. Each bearing block 56 is held down upon the surface 57 by means of a top plate 61, and in the form of the invention disclosed in Figs. 1 to 5 one end of this top plate 61 is secured to the top of the end member 59 by screws 62 and the other end of which is held down upon the top of the side frame 16 to the left of the face 58 by means of screws 63.

To press the rubber roll against the die roll, suitable adjusting means is provided for the blocks 56, and in the present instance this adjusting means comprises, for each bearing block, an adjusting or tightening screw 64 extending through a nut 65 fixed in the end member 59 of the bearing. The adjusting screw extends perpendicular to the axis of the rubber roll 50 and on its outer end has an operating handle 66. An inner or left-hand end has a reduced rounded portion 67 engaging a corresponding socket in the end of the bearing block 56 so that the bearing block may be moved to the left by operation of the screw, thereby to force the rubber roll 19 against the die roll 56. The block 56, however, is disengageably related to the end 67 so that the bearing blocks 56 and the rubber roll may be lifted from the bearing surfaces 57 when the top members 61 are removed. Such removal is required when a new extracting belt 25 is to be put in place on the machine, the most desirable of such extracting belts being made in an endless form rather than being fastened together on the machine.

If it is desired to have the adjusting screws 64 function also to withdraw the bearing blocks 56, an under-cut or T-slot may be formed vertically in the right-hand ends of the blocks 56, and a corresponding head may be formed on the left-hand ends of the screws 64 to engage such T-slots. The bearing blocks 56 would in such a case be easily releasable from the screws 64 by vertical lifting of the blocks 56.

The nose plate 27, in accordance with the present invention, is mounted at a fixed spacing with relation to the side frames 16; and the desired tightening of the belt 25 is attained through movement of the idler roll 55. The mounting of the nose plate 27 is attained in the present instance by means of a pair of arms 70, each of which is fixed permanently to the nose plate 27. The arms 70 are disposed at opposite ends of the nose plate 27, and extend to the side frames 16 parallel to the side edges of the extracting belt 25. The left-hand ends of the arms 70 are secured to the inner faces of the side frames 16 by pivot pins 71 which are co-axial. Thus the nose plate may be pivoted upwardly about the pivot pins 71 and if desired such movement of the nose plate may be utilized in loosening the belt in connection with the removal of a die roll as will hereinafter be explained. When the extracting belt 25 is driven, by its contact with the die roll 19, the movement of the belt serves to hold the pivoted arms and the nose plate 27 downwardly and relatively close to the conveyor 13. If desired a suitable stop means may be provided on the nose plate 27 for engagement with the surface 14, thus to limit the downward movement of the nose plate 27 by the belt 25, and avoid undue stress on the belt.

Figure 2:
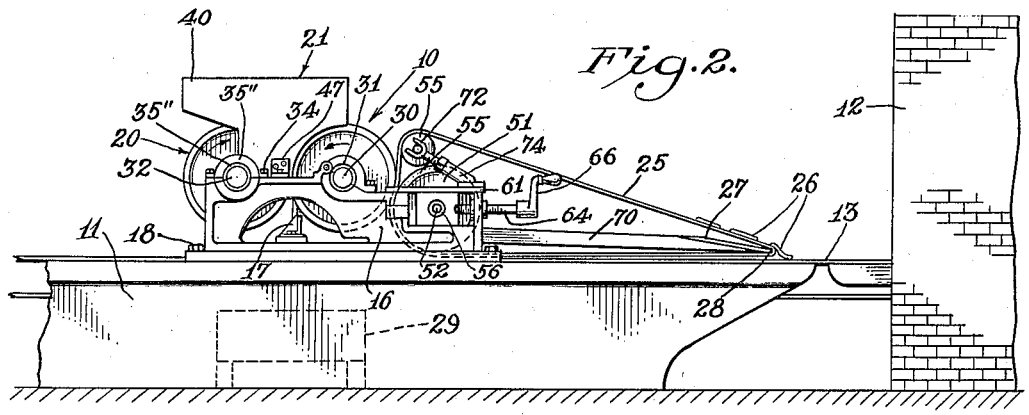
Fig. 2 is a side elevational view of the machine of Fig. 1 illustrating the machine of the present invention in an operative relation to a machine base such as the base of a conventional molding or cutting machine.

The present invention so mounts the idler roll 55 that it may be readily moved to an out-of-the-way position when a die roll is to be removed and this mounting is such as to provide for convenient shifting of the idler roll 55 to tighten the extracting belt 25. As herein shown, in both embodiments of the invention, a pair of forked mounting members 72 are provided to engage the projecting end trunnions 73' of the idler roller 55. In the form shown in Figs. 1 to 3, each forked bearing 72 has a threaded stem 73 which projects into a supporting socket 74, and as shown in Figs. 1 to 3, this supporting socket is secured as by means of screws 62 on the top of the member 61 and directly above the end member 59. From this point of support the socket of the embodiment of Figs. 1 to 3 is so disposed that its central axis extends upwardly at an angle of about 30° and to the left. A tightening nut 75 is threaded on each screw shank 73 so as to limit the movement of the shanks 73 into the socket 74. Thus by manipulation of the nut 75 with relation to the screw shank 73 the axial position of the shank 73 may be adjusted. Such adjustment is upwardly and to the left in Fig. 3, so that by adjustment of the two nuts 75 the belt 25 may be tightened. When the die roll is to be removed the nuts 75 may be manipulated to withdraw the forked bearings 72 to the right, thereby to loosen the belt and permit the idler roll 55 to be removed from the bearing 72 to the out-of-the-way position such as that shown in Fig. 1. Such loosening of the belt 25 may also be attained by upward pivoting of the nose plate 27 as heretofore explained.

In the alternative construction illustrated in Figs. 6 to 10, inclusive, the invention is embodied in a cooky molding machine 110 adapted for association with the base 11 of a conventional cracker cutting machine or the like in the same general manner as the machine 10 of Figs. 1 to 5, so that cooky blanks molded by the machine 110 may be discharged in the same manner upon pans or upon a conveyor 13.

The cooky molding machine 110 of Figs. 6 to 10, inclusive, is similarly adapted to be mounted on the upper surface 14 of the side rails 15 of the frame 11, and the cooky molding machine 110 is so constructed that all of its operating parts are disposed above the level of the surface 14. Similar side frames 116 are secured onto the surface 14 of the side rails 15 by means of headed studs 118.

The side frame members 116 serve to support the various operating members of the present invention in the same general manner as in the other embodiment, there being a cylindrical die roll 119 and a forcing roll 120 of conventional form disposed on parallel transverse axes with a hopper 121 overlying portions of the exposed upper faces of the rolls 119 and 120 so that when the two rolls are operated in unison in opposite directions by means such as drive gears 122 and 123 the dough in the hopper 121 is forced into the cooky molding die cavities 124 of the die roll 119. Excess dough on the exposed faces of the molded cooky blanks is removed by means of knife means mounted in the space beneath the adjacent lower surfaces of the rolls 119 and 120, and in accordance with the present invention this knife means is arranged to withstand shock and wear to an extent heretofore unattainable.

As these cooky blanks move with the roll 119 toward the right and upwardly in Fig. 7, the blanks are contacted by the surface of an endless extracting belt 125 to which the cookies 126 adhere so as to be withdrawn from the die cavities in which they have been molded or formed. The delivery belt 125 extends to the right in Figs. 6 and 7 and downwardly about a nose plate 127 which has a fairly sharp forward edge 128 and the cookies therefore fall in a known manner from the belt 125 onto the conveyor 13 or other means by which they are then moved through the oven.

The gears 122 and 123 of rolls 119 and 120 are intermeshed so as to produce the desired rotation of these two rolls, and the gears may be driven by any conventional means, such as that described in connection with Fig. 2.

The cooky molding roll 119 has a central shaft 130 upon which the drive gear 122 is fixed at one end, and the projecting ends of this shaft 139 provide trunnions 131 which are adapted to rest in suitable bearings in the side frames 116. The forcing roll 120 has a similar central shaft 132 having its projecting ends arranged to form supporting trunnions. These supporting or trunnion-like ends of the shaft 132 of the forcing roll 120 are supported in similar bearings 133 formed along the upper edge of the side frames 116 adjacent the left-hand end thereof as herein shown, the bearings 133 being formed and positioned in the same manner as the bearings 33 of Fig. 1.

The molding roll 119 is supported on an axis which is at the same height as the axis of the forcing roll 120, and such support is, in accordance with the present invention provided by readily separable bearings 135 which are formed and positioned in the same manner as the bearings 35 shown in Fig. 1, thereby to facilitate the removal and replacement of the die roll 119.

The hopper 121 is formed and mounted in substantially the same manner as the hopper shown in Figs. 1 to 3, so that it may be readily moved to an out-of-the-way position in the same manner. A similar interlocked bearing means 145 provided on the hopper 121, which, with similar angle brackets 147 and clamping studs 149 provides for convenient shifting of the hopper 121 as explained in connection with Figs. 1 to 3. In the embodiment of Figs. 6 to 10, however, the hopper has a bottom wall 144 which slopes at a rather steep angle to a point beyond the uppermost point on the forcing roll 120, thereby to feed the dough more efficiently into the trough-like space between the two rolls 119 and 120.

The extracting belt 125 is pressed against the die roll 119 by resilient means such as a rubber covered roll 150 which is in many instances termed the extracting roll. This roll 150 is constructed and mounted in the same general manner as the roll 50 of Figs. 1 to 3, with the ends of its central shaft 152 in bearing blocks 156 so that the rubber roll opposes the die roll 119 slightly below a horizontal plane passing through the axis of the die roll. The extracting belt is, of course, extended from the nose plate 127 to the left beneath the rubber roll 150 and between the rubber roll and the die roll so as to extend over an elevated tightening or idler roll 155 which is supported above the rubber roll and in spaced relation to the die roll. From the idler roll 155 the upper run of the belt 125 extends to the right over the nose plate 127.

In the embodiment illustrated in Figs. 6 to 10, the rubber roll 150 is supported somewhat lower than in the embodiment of Figs. 1 to 5, while yet maintaining the lower face of the roll in spaced relation to the surface 14 and the conveyor 13. The rubber roll 150 is also supported for movement toward and away from the die roll 119 so that the pressure of the rubber roll against the die roll may be adjusted to produce the optimum extracting action. Such a mounting is attained in substantially the same manner as in the other embodiment, the bearing blocks 156 being supported on horizontal surfaces 157 formed in the side frames 116 adjacent the right ends thereof. Movement of the bearing block 156 to the left is limited by an end surface 158, while movement to the right is limited by vertical end members 159 which are secured by means of screws 160 to the right-hand ends of the side frames 116. In the embodiment of Figs. 6 to 10, each bearing block 156 is held down upon the surface 157 by means of a top plate 161, one end of which is secured to the top of the end member 159 by a hinged connection 162 and the other end of which is held down upon the top of the side frame 116 to the left of the face 158 by means of screws 163. With this construction the top plates 161 may be readily released by removal of the screws 163, whereupon the top plates 161 may be pivoted to out of the way positions so as to facilitate upward withdrawal of the rubber roll 150 and its bearing blocks 156.

To press the rubber roll against the die roll, suitable adjusting means is provided for the blocks 156, and in the present instance this adjusting means comprises a screw threaded adjusting device 164 for each bearing block. The adjusting devices 164 of Figs. 6 to 10 are constructed and mounted in the same manner as the corresponding devices of Fig. 1, and function in the same manner to force the bearing blocks 156 and the rubber roll 150 to the left in Fig. 7 into the desired operative relation to the die roll 119. When the desired positioning of the rubber roll 150 has been determined, this adjustment is preserved in the embodiment of Figs. 6 to 10 by means of adjustable stop means which may be left in any adjusted position even though the adjusting devices 164 are disturbed. This stop means as herein shown comprises a pair of stop screws 165, one of which is threaded through each frame 116 so as to extend beyond the surface 158 and toward the left-hand end of the associated bearing block 156. These screws 165 extend through webs 166 which form the end surface 158. Thus when the rubber roll 150 has been adjusted so as to exert the desired extracting pressure on the die roll 119, the stop screws 165 are tightened against the left-hand ends of the bearing blocks 156. The adjustment of the devices 164 may then be disturbed at will, and may be readily re-established merely by forcing the two bearing blocks 156 back against the stop screws 165.

The nose plate 27, in accordance with the present invention, is mounted at a fixed spacing with relation to the side frames 116, and the desired tightening of the belt 125 is attained through movement of the idler roll 155. The mounting of the nose plate 27 is attained in the present instance by means of a pair of arms 170, each of which is fixed permanently to the nose plate 127. The arms 170 are disposed adjacent to opposite ends of the nose plate 127, and extend to the side frames 116 parallel to the side edges of the extracting belt 125. The left-hand ends of the arms 170 are secured to the inner faces of the side frames 116 by pivot pins 171 which are coaxial. In the form shown in Figs. 6 to 10, the nose plate 127 extends outwardly beyond the arms 170, so as to overlie the side rails 15, and slots 127' are provided in these projecting ends through which fastening bolts 170' may extend into threaded engagement with the rails 15.

Thus a predetermined spacing of the nose plate 127 with respect to the belt 13 may be established, and this relation will be independent of and undisturbed by tightening of the belt 125. Thus uniform discharge of the cookies from the belt 125 onto the belt 13 is assured.

The present invention so mounts the idler roll 155 that it may be readily moved to an out-of-the-way position when a die roll is to be removed and this mounting is such as to provide for convenient shifting of the idler roll 155 to tighten the extracting belt 125. As herein shown a pair of forked mounting members 172 are provided to engage the projecting end trunnions 173' of the idler roller 155. Each forked bearing 172 has a threaded stem 173 which is so mounted that the desired adjustment of the idler roll may be attained.

In the form shown in Figs. 6 to 10, such support is provided by upstanding brackets 174 formed integrally on the top plates 161. Each bracket 174 includes a pair of spaced lugs 175 with aligned bores 176 formed therein to slidably receive the stems 173. Between the lugs 175 a knurled nut 177 is threaded on each threaded stem, so that by rotation of the nut 177, while the bearing shaft 173 of the idler roller 155 holds the bearing and its threaded stem against rotation, results in the desired adjusting movement of the associated forked bearing. In the form shown in Figs. 6 to 10, the threaded stems 173 are positioned horizontally, but if desired, an angular positioning might be adopted approaching the 30° inclination employed in the other embodiment.

The knife means constructed in accordance with the present invention and embodied in the cooking machine illustrated in Figs. 6 to 10 is mounted in the space beneath the two rolls 119 and 120. As herein shown, this knife means is indicated generally at 180 and comprises a supporting shaft 181 preferably made from a good quality of steel shafting and supported so as to be positioned immediately below the adjacent edges of the two rolls 119 and 120. Such support for the shaft 181 is provided by two bosses 182 formed one on the upper face of the bottom rail 183 of each side frame 116. Immediately above the boss 182, the center web of the side frame 116 is recessed or cut away as at 184.

The shaft 181 extends at its opposite ends through aligned bores 185 formed in the two bosses 182, and intermediate these two points of support, the shaft 181 carries a knife holder 186. This knife holder 186 may be in the form of a casting having bearing lugs 187 at its opposite ends embracing the shaft 181. At spaced points intermediate the bearing lugs 187 the knife holder 186 preferably has arcuately formed bearing pads 188 which rest against the upper surface of the shaft 181. On a surface 189 of the knife holder 186, a knife 190 is secured as by means of a plurality of screws 191 and preferably the lower edge of the knife 190 rests against an upwardly facing shoulder or surface 192 formed on the knife holder. The knife 190 is so proportioned that its upper edge 193 may be shifted to the right in Fig. 9 so as to engage the outer surface of the die roll 119 slightly below a horizontal plane passing through the axis of the die roll, and the knife normally urged into such engagement by spring means. This spring means, in accordance with the present invention, comprises a pair of expansive coiled springs 195 which surround the guide rods 196 mounted in the side frames 116 as shown in Fig. 9. Each guide rod 196 is mounted in an end web 197 of its side frame 116 so as to act between the associated web 197 and an arm 198 which projects endwise from the adjacent end of the knife holder 186. Each guide rod 196 extends through its arm 198 so as to be supported thereby, and hence the springs act under all conditions to yieldingly urge the knife 190 into operative engagement with the die roll 119.

The guide rods 196 also are utilized in the present instance to provide means acting as stops to limit the clockwise movement of the knife (Fig. 9) when the die roll 119 is removed. Thus guide rods 196 have heads 199 thereon, located on the right-hand side of the arms 198 so as to limit the movement of the knife by the springs 195. Preferably the heads 199 are of non-circular form and fit in complemental sockets in the arms 198, so that by means of nuts 200 threaded on the left-hand ends of the rods 196, the range of movement of the knife by its springs 195 may be adjusted and varied.

Since the supporting shaft 181 may be made of a relatively high quality steel, and since this shaft is positioned along the lower edge of the knife holder 186 with several spaced points of supporting engagement with the knife holder, it will be apparent that the hammer-like blows, that are applied to the knife and to the knife holder when defects are present in the surface of the die roll 119, will be resisted in such a manner as to prevent cracking and breaking of the knife holder. Such breaking of the knife holder has heretofore been quite common and by the present construction it will be evident that the loss of machine or operating time due to such breakage will be substantially eliminated.

By mounting both the die roll and the rubber roll so that their separable bearings open upwardly from the exposed top edge of the side frames, the present machine is rendered highly practical and convenient in use. The removal of the die roll may, of course, be easily accomplished, and in addition, the rubber roll may be readily taken out for mounting of a new extraction belt on the machine.

The mounting of the rubber roll so that a substantial part of its end surface is exposed is of great importance, since it enables the user to preserve the rubber roll for a length of time heretofore not attainable. This important result is attained by reason of the fact that the user may frequently wipe the grease or shortening from the end surface of the roll, and thereby prevent this grease from working into the annular joint between the rubber sleeve and its core. Such grease is expressed from the cooky dough in the normal use of the machine, and while the rubber sleeve may in itself be made from a grease resistant rubber, it has been impossible to produce a grease resistant joint between the rubber sleeve and the steel core. I have discovered that such grease works into the joint between the sleeve and the core, and in actual practice gradually loosens the sleeve from the core. As this loosening progresses, the cookies adjacent the ends of the die roll are not extracted properly. I have further discovered that by wiping this grease from the ends of the rubber roll at frequent intervals, proper extraction of the cookies may be attained for a much longer period with a given rubber roll.

When a machine of this character is in operation, the extracting belt, by uneven stretching or for other reasons, often tends to run with a bias or camber so as to move to the right or left on its guide roller and nose plate, and heretofore, such bias running of the belt was corrected solely by adjustment of the nose plate. This nose plate adjustment was also used to tighten the extracting belt; and in many instances the required adjustment was such as to displace the nose plate from its desired right angle relation to the conveyor path, and in addition, often tended to disrupt the desired relation of the cooky discharge line to the pan positioning on a pan conveyor.

By the present construction the nose plate remains, in a functional sense, substantially stationary with respect to the conveyor, and the required adjustment is attained by means of the idler roller 55, thereby to avoid the objectionable results of the prior nose plate type of adjustment. In addition, this adjustment is made adjacent to the point of extraction, so that the effect of the adjustment on the extraction may be carefully observed as the adjustment progresses.

The mounting of the hopper in the present case is such as to assure proper positioning of the hopper with relation to the forcing and molding rolls when the hopper is in its normal upright position; and in addition, the hopper is guided and supported in its movement to and from its out-of-the-way position, thereby to facilitate this operation and give assurance that the die roll will not be injured in the manipulation of the hopper. The shifting movement of the hopper being so guided, may be said to have a rocking movement to and from its out-of-the-way position.

After the hopper has been rocked to its out-of-the-way position, the belt released, and the idler roller removed from its bearings, the removal of the die roll from its opened bearings is extremely simple in the present machine. This simplicity results in a large measure from the point or line of engagement of the rubber roll with the die roll. This line of engagement is slightly below the horizontal plane passing through the axis of the die roll bearings, so that the die roll may in effect be rolled upwardly and to the right (Fig. 1) along the surface of the rubber roll. In such rolling movement it will be noted that the angle of the separation of the bearing 35 has an important relation, for it is clear that in such rolling movement of the die roll along the surface of the rubber roll, the trunnion portions 31 of the die roll shaft move freely out of the lower portions 35' of the bearings 35.

Such rolling relation of the die roll along the rubber roll is also of great importance in mounting the die roll in the machine, since it simplifies the operation and reduces the effort required to support the die roll, and thereby insures against damage to the die roll or its bearings. The pivot upper sections 35" of the bearings, being located on the sides of the bearings opposite from the rubber roll, are, of course, out of the way at all times during the changing of the die roll.

By locating the rubber roll on the forward side of the die roll, so as to engage the die roll only slightly below the plane passing through the die roll axis, the present invention provides a cooky molding machine which may use a relatively large rubber roll, and yet have but a small height above the discharge level of the extracting belt. Thus the use of the machine is simplified. Moreover, the elements are disposed so that the present machine may be used as an attachment for mounting on various cutting machine bases, or on the frame of steel band conveyors. Also the present machine may be provided with its own base, either portable or stationary, so that the present molding structure may be used in a large variety of ways.

The rubber roll mounting of the present machine is of particular advantage as compared with prior machines, in that the bearing blocks 56 are mounted directly upon the heavy side frames 16, and the weight of the rubber roll is supported directly by the surface 57 rather than upon a rocking carrier or vertical feed screw as heretofore. Thus the only force placed upon the adjusting devices 64 is the pressure acting between the rubber roll 50 and the die roll 19, and any upward or downward force is taken by the relatively heavy cap plate 61 or the bearing surface 57 of the frame 16. Consequently the alignment and adjustment of the rubber roll in the present machine are attained and preserved much more effectually than has heretofore been possible.

In enabling the user to preserve the alignment of the various operating parts of the machine, the hopper construction of the present machine is unique, for it will be evident that when the hopper 21 is in its retracted position of Fig. 1, it may be lifted upwardly and easily removed from the machine without disturbing the alignment or mounting of any of the other parts of the machine. Such removal is sometimes required for the inspection or repair of the other parts of the machine.

In maintaining and assuring proper operation of the machine, the relative positioning of the rubber roll and the axis of the die roll, and the form and inter-relation of the bearings 35 are of particular importance. This importance becomes clear by comparison with prior machines wherein the force applied by the rubber roll was taken solely by the removable section or cap of the die roll bearing. This action was due to the mounting of the rubber roll beneath the die roll so that it pressed upwardly on the die roll. In the present machine it will be noted that the line of application of the force to the die roll by the rubber roll is such that this force acts on a portion of the fixed section 35' of the bearing 35. Moreover, this force applied by the rubber roll is in its principal component, directly opposed to the reactive force between the die roll and the forcing roll, with the result that the wear producing forces on the bearing 35 are relatively small. Hence the present machine causes less difficulty in practical use, and reduces the idle time heretofore required for repairs and adjustment.

It will be understood that in the foregoing I have described what I now consider to be the best mode in which I contemplate applying my invention but it is to be understood that this is capable of variation and modification and I therefore do not wish to be limited to the precise details set forth but desire to avail myself of such changes and alterations as fall within the purview of the following claims.

I claim:

1. A rotary cooky molding machine of the character described comprising, in combination, a pair of side frame members, corresponding pairs of separable bearings formed in spaced relation along the top of each side frame member, a forcing roll mounted in the corresponding bearings of the two side frame members adjacent one end thereof, a cooky die roll mounted in the other corresponding bearings so as to be in opposed and relatively close relationship to said forcing roll, a hopper mounted on said side frame members and formed and disposed so as to provide an open bottom portion overlying the opposed upwardly facing portions of said die roll and forcing roll, and an extracting means for removing the molded cooky blanks from said die roll including an endless extracting belt, a nose plate mounted on said side frame members, an idler roller and a resilient rubber covered roll operable to press said extracting belt against said cooky die roll, and means for adjustably supporting said rubber covered roll including bearing means mounted in the upper portion of said side frame members and adapted to be opened for upward removal of said rubber covered roll from said side frame members.

2. A rotary cooky molding machine of the character described comprising, in combination, a pair of side frame members, a forcing roll, and a cooky die roll disposed in parallel, opposed and relatively close relationship transversely between said side frame members with their axes lying in a common substantially horizontal plane, a hopper mounted on said side frame members and formed and disposed so as to provide an open bottom portion overlying the opposed upwardly facing portions of said die roll and forcing roll, and an extracting means for removing the molded cooky blanks from said die roll including an endless extracting belt, a nose plate mounted on said side frame members, an idler roller and a resilient rubber covered roll operable to press said extracting belt against said cooky die roll, and means for supporting said rubber covered roll, and said die roll and said forcing roll comprising separable bearing means mounted in the upper portion of said side frame members and having the separable portion of each bearing means removably upwardly so that all of said rolls may be removed by upward lifting from said side frame members.

3. A rotary cooky molding machine of the character described comprising, in combination, a pair of side frame members, corresponding pairs of separable bearings formed in spaced relation along the top of each side frame member, a forcing roll mounted in the corresponding bearings of the two side frame members adjacent one end thereof, a cooky die roll mounted in the other corresponding bearings of said side frame members so as to be in opposed and relatively close relationship to said forcing roll, a hopper mounted on said side frame members and formed and disposed so as to provide an open bottom portion overlying the opposed upwardly facing portions of said die roll and forcing roll, and an extracting means for removing the molded cooky blanks from said die roll including an endless extracting belt, a nose plate mounted on said side frame members, an idler roller and a resilient rubber covered roll operable to press said extracting belt against said cooky die roll, means for adjustably supporting said rubber covered roll including bearing means mounted in the upper portion of said side frame members and adapted to be opened for upward removal of said rubber covered roll from its bearings in said side frame members, and means for supporting said idler roller comprising a pair of forked bearing members, and trunnions projecting from the ends of said idler roller adapted to run in said forked bearing when said extracting belt is relatively tight, and adapted to be removed from said forked bearings by lateral movement of said idler roller when said extracting belt has been loosened.

4. A rotary cooky molding machine of the character described comprising, in combination, a pair of side frame members, corresponding pairs of separable bearings formed in spaced relation along the top of each side frame member, a forcing roll mounted in the corresponding bearings of the two side frame members adjacent one end thereof, a cooky die roll mounted in the other corresponding bearings so as to be in opposed and relatively close relationship to said forcing roll, a hopper mounted on said side frame members and formed and disposed so as to provide an open bottom portion overlying the opposed upwardly facing portions of said die roll and forcing roll, and an extracting means for removing the molded cooky blanks from said die roll including an endless extracting belt, a nose plate mounted on said side frame members, an idler roller and a resilient rubber covered roll operable to press said extracting belt against said cooky die roll, means for adjustably supporting said rubber covered roll including bearing means on said side frame members and means for supporting said idler roller comprising a pair of forked bearing members, and trunnions projecting from the ends of said idler roller adapted to run in said forked bearing when said extracting belt is relatively tight, and adapted to be removed from said forked bearings by lateral movement of said idler roller when said extracting belt has been loosened.

5. In a rotary type cooky molding machine, the combination of a pair of side frame members having opposed forcing and cooky die rolls mounted therein, said rolls being mounted in bearings formed along the upper edge of the side frame members, means for extracting the molded cooky blanks from said cooky die roll, and a hopper for feeding dough into the space between said cooky die roll and said forcing roll, said hopper including end plates having an arcuate bearing surface formed therein, and the bearings for said forcing roll having external annular bearing surfaces engaged by said arcuate bearing surfaces in said end plates so that said hopper may be rocked away from said cooky die roll about the axis of said forcing roll bearings, and clamping means on said end plates adapted to be secured to said side frame members intermediate the bearings of said forcing roll and said cooky die roll, each said arcuate surface, when said hopper is in its desired operative relation, being arranged to extend in engagement with its annular bearing surface from the top of said annular surface, downwardly along the side of said annular surface which is adjacent to said die roll, and about a part of the lower portion of said annular surface, said clamping means cooperating with the interlocked action of said arcuate bearing surface and said annular bearing surfaces to position said hopper rigidly in the desired operative relation to said cooky die roll and said forcing roll.

6. In a rotary type cooky molding machine, the combination of a pair of side frame members having opposed forcing and cooky die rolls mounted therein, said rolls being mounted in bearings formed along the upper edge of the side frame members, means for extracting the molded cooky blanks from said cooky die roll, and a hopper for feeding dough into the space between said cooky die roll and said forcing roll, said hopper including end plates, means providing a pivotal mounting for said hopper on an axis substantially coinciding with the axis of said forcing roll, so that said hopper may be rocked away from said cooky die roll substantially about the axis of said forcing roll bearings, and clamping means on said end plates adapted to be secured to said side frame members intermediate the bearings of said forcing roll and said cooky die roll, said pivotal mounting means cooperating with the clamping means to position said hopper rigidly in the desired operative relation to said cooky die roll and said forcing roll.

7. A cooky molding machine of the rotary type comprising, in combination, a pair of side frame members mounted in fixed spaced relation to each other, a forcing roll mounted between said side frame members, a cooky die roll extending between said side frame members in opposed relation to said forcing roll, means for driving said rolls in opposite directions in unison, and bearing means for supporting said cooky die roll comprising a separable bearing for each end of the die roll, each bearing comprising a fixed section formed in the upper edge of one of said side frame members and a shiftable bearing section separable from said fixed section along a plane disposed at an angle of substantially 30° to the horizontal and so arranged that in movement of the die roll out of said bearings the die roll is moved upwardly and in a direction slightly away from said forcing roll.

8. A cooky molding machine of the rotary type comprising, in combination, a pair of side frame members mounted in fixed spaced relation to each other, a forcing roll mounted between said side frame members, a cooky die roll extending between said side frame members in opposed relation to said forcing roll, means for driving said rolls in opposite directions in unison, bearing means for supporting said cooky die roll comprising a separable bearing for each end of the die roll, each bearing comprising a fixed section formed in the upper edge of one of said side frame members and a shiftable bearing section separable from said fixed section along a plane disposed at an angle of substantially 30° to the horizontal and so arranged that in movement of the die roll out of said bearings the die roll is moved upwardly and in a direction slightly away from said forcing roll, and means pivoting each said shiftable section to its fixed section on the uppermost side of its said fixed section.

9. A rotary cooky molding machine of the character described comprising, in combination, a pair of side frame members, opposed forcing and cooky die rolls mounted in said side frame members in opposed relation, means for rotating said rolls in opposite directions in unison, a hopper for feeding dough to said rolls, and an extracting means for removing molded cooky blanks from said cooky die rolls comprising an endless extracting belt, means for supporting and guiding said extracting belt comprising a nose plate, an idler roller and a resilient roll for pressing the belt against said cooky die roll, means supporting said nose plate comprising a pair of arms fixed to said nose plate and pivotally connected on a common axis to said side frame members adjacent to said resilient roll, and means supporting said idler roller for adjustment to tighten said belt.

10. A rotary cooky molding machine of the character described comprising, in combination, a pair of side frame members, opposed forcing and cooky die rolls mounted in said side frame members in opposed relation, means for rotating said rolls in opposite directions in unison, a hopper for feeding dough to said rolls, and an extracting means for removing molded cooky blanks from said cooky die rolls comprising an endless extracting belt, means for supporting and guiding said extracting belt comprising a nose plate, an idler roller and a resilient roll for pressing the belt against said cooky die roll, means supporting said nose plate comprising a pair of arms fixed to said nose plate and pivotally connected on a common axis to said side frame members adjacent to said resilient roll, means supporting said idler roller for adjustment to tighten said belt, and means on said nose plate for securing said nose plate in predetermined vertical position.

11. A rotary cooky molding machine of the character described comprising, in combination, a pair of side frame members, corresponding pairs of separable bearings formed in spaced relation along the top of each side frame member, a forcing roll mounted in the corresponding bearings of the two side frame members adjacent one end thereof, a cooky die roll mounted in the other corresponding bearings so as to be in opposed and relatively close relationship to said forcing roll, a hopper mounted on said side frame members and formed and disposed so as to provide an open bottom portion overlying the opposed upwardly facing portions of said die roll and forcing roll, and an extracting means for removing the molded cooky blanks from said die roll including an endless extracting belt, a nose plate, an idler roller and a resilient rubber covered roll operable to press said extracting belt against said cooky die roll, and means for adjustably supporting said rubber covered roll including bearing members in which said rubber covered roll is rotatably mounted and means supporting said bearing members in the upper portion of said side frame members including top plate members normally engaged with said bearing members and adapted to be opened for upward removal of said rubber covered roll from said side frame members, each of said top plate members being detachably fastened in position at the end thereof adjacent to said die roll and being pivoted to the side frame member at the other end thereof on an axis substantially parallel to the axis of the die roll bearings.

12. A rotary cooky molding machine of the character described comprising, in combination, a pair of side frame members, corresponding pairs of separable bearings formed in spaced relation along the top of each side frame member, a forcing roll mounted in the corresponding bearings of the two side frame members adjacent one end thereof, a cooky die roll mounted in the other corresponding bearings so as to be in opposed and relatively close relationship to said forcing roll, a hopper mounted on said side frame members and formed and disposed so as to provide an open bottom portion overlying the opposed upwardly facing portions of said die roll and forcing roll, and an extracting means for removing the molded cooky blanks from said die roll including an endless extracting belt, a nose plate, an idler roller and a resilient rubber covered roll operable to press said extracting belt against said cooky die roll, means for adjustably supporting said rubber covered roll including bearing members in which said rubber covered roll is rotatably mounted and means supporting said bearing members in the upper portion of said side frame members including top plate members normally engaged with said bearing members and adapted to be opened for upward removal of said rubber covered roll from said side frame members, each of said top plate members being detachably fastened in position at the end thereof adjacent to said die roll and being pivoted to the side frame member at the other end thereof on an axis substantially parallel to the axis of the die roll bearings, and bearing means for said idler roller carried on the tops of said top plate members and including means for adjusting said idler roller toward said die roll.

13. A rotary cooky molding machine of the character described comprising, in combination, a pair of spaced side frame members, a forcing roll and a cooky die roll disposed in parallel, opposed and relatively close relationship transversely between said side frame members with their axes lying in a common substantially horizontal plane, a hopper mounted on said side frame members and formed and disposed so as to provide an open bottom portion overlying the opposed upwardly facing portions of said die roll and forcing roll, an extracting means for removing the molded cooky blanks from said die roll, and knife mechanism for scraping excess dough from said die roll and from the exposed sides of the molded cooky blanks, said knife mechanism comprising a shaft extending between said frame members in the space beneath the opposed portions of said rolls, a knife holding member mounted on said shaft for rocking movement about the axis of said shaft, a knife removably fastened to said knife holding member for operative engagement with the cylindrical surface of said die roll when said knife holding member is rocked in one direction, means acting on said knife holding member to resiliently urge said knife into such operative engagement with the die roll, and means operable to limit the rocking movement of said knife holding member when said die roll is removed.

14. A rotary cooky molding machine of the character described comprising, in combination, a pair of side frame members, a forcing roll and a cooky die roll disposed in parallel, opposed and relatively close relationship transversely between said side frame members with their axes lying in a common substantially horizontal plane, a hopper mounted on said side frame members and formed and disposed so as to provide an open bottom portion overlying the opposed upwardly facing portions of said die roll and forcing roll, an extracting means for removing the molded cooky blanks from said die roll, and knife mechanism for scraping excess dough from said die roll and from the exposed sides of the molded cooky blanks, said knife mechanism comprising a shaft extending between said frame members in the space beneath the opposed portions of said rolls, a knife holding member mounted on said shaft for rocking movement about the axis of said shaft and having a plurality of points of abutment with the top of said shaft at points spaced longitudinally of said shaft, a knife removably fastened to said knife holding member for operative engagement with the cylindrical surface of said die roll when said knife holding member is rocked in one direction, and spring means acting on said knife holding member to resiliently urge said knife into such operative engagement with the die roll.

15. A rotary cooky molding machine of the character described comprising, in combination, a pair of side frame members, corresponding pairs of separable bearings formed in spaced relation along the top of each side frame member, a forcing roll mounted in the corresponding bearings of the two side frame members adjacent one end thereof, a cooky die roll mounted in the other corresponding bearings so as to be in opposed and relatively close relationship to said forcing roll, a hopper mounted on said side frame members and formed and disposed so as to provide an open bottom portion overlying the opposed upwardly facing portions of said die roll and forcing roll, and an extracting means for removing the molded cooky blanks from said die roll including an endless extracting belt, a nose plate, an idler roller and a resilient rubber covered roll operable to press said extracting belt against said cooky die roll, and means for adjustably supporting said rubber covered roll including bearing members in which said rubber covered roll is rotatably mounted and means supporting said bearing members in the upper portion of said side frame members including top plate members normally engaged with said bearing members and adapted to be opened for upward removal of said rubber covered roll from said side frame members, means for adjustably shifting said bearing members to shift said rubber roll into contact with the die roll, and adjustable stop means opposing said adjusting means and operable to provide an indication of a selected adjustment of said bearing members.

EDWARD A. WEIDENMILLER.